United States Patent [19]

Hutto

[11] Patent Number: 4,901,749

[45] Date of Patent: Feb. 20, 1990

[54] REVERSIBLE BOTTOM VALVE CARTRIDGE WITH AN ORIENTING MECHANISM

[75] Inventor: Joe D. Hutto, Indianapolis, Ind.

[73] Assignee: Masco Corporation of Indiana, Taylor, Mich.

[21] Appl. No.: 369,562

[22] PCT Filed: Jun. 25, 1987

[86] PCT No.: PCT/US87/01561

§ 371 Date: Feb. 24, 1989

§ 102(e) Date: Feb. 24, 1989

[87] PCT Pub. No.: WO88/10386

PCT Pub. Date: Dec. 29, 1988

[51] Int. Cl.⁴ .................. F16K 11/06; F16K 25/00
[52] U.S. Cl. .................. 137/270; 137/454.2; 137/625.4
[58] Field of Search .................. 137/270, 454.2, 454.6, 137/625.17, 625.21, 625.41; 251/367

[56] References Cited

U.S. PATENT DOCUMENTS

| | | | |
|---|---|---|---|
| 3,089,505 | 5/1963 | Forster | 137/270 |
| 3,674,048 | 7/1972 | Manoogian et al. | 137/270 |
| 4,005,728 | 2/1977 | Thorp | 137/270 |
| 4,243,063 | 1/1981 | Parkison | 137/625.41 X |
| 4,362,186 | 12/1982 | Parkison et al. | 137/625.4 X |
| 4,378,029 | 5/1983 | Parkison | 137/625.4 |
| 4,423,752 | 1/1984 | Psarouthakis | 137/270 X |
| 4,557,288 | 12/1985 | Botnick | 137/454.6 X |
| 4,584,723 | 4/1986 | Hussauf | 137/625.4 X |
| 4,662,388 | 5/1987 | Eaton et al. | 137/270 |
| 4,676,270 | 6/1987 | Knapp et al. | 137/625.4 |

Primary Examiner—John Rivell
Attorney, Agent, or Firm—Steven L. Permut; Malcolm L. Sutherland

[57] ABSTRACT

A cartridge valve 10 for a faucet has a shell 12 housing a movable valve plate 22 and an operating stem 20 able to control the plate 22 by operating mechanism 17. A bottom member 19 has hot and cold water inlets 54 and 56. A fixed valve plate 23 is seated on the bottom member 19 and has hot and cold water outlets 50 and 52 in communication with the inlets 54 and 56. The shell has orienting notches 42 and 44 with notch 44 having a removable prong 46 therein. Bottom member 19 has two orienting tabs 38 and 40 with tab 40 having a groove 48 that receives prong 46 to assure a correct first orientation of the bottom member to shell 12. The prong 46 can be removed if the bottom member 19 is desired to mount to the shell 12 in a second reversed position that is 180° rotated from the first orientation.

13 Claims, 1 Drawing Sheet

REVERSIBLE BOTTOM VALVE CARTRIDGE WITH AN ORIENTING MECHANISM

TECHNICAL FIELD

The present invention relates to a faucet valve and more particularly to a faucet valve that has a reversible bottom section for installation in a single handle faucet.

BACKGROUND OF THE INVENTION

Plumbers conventionally install hot and cold water lines when they can such that the hot water line is on the left and the cold water line is on the right. Faucet manufacturers have also made single handle mixing faucets with their own conventional operation. Faucet levers moved to the right deliver cold water and moved to the left deliver hot water. Faucet manufacturers recognize the importance of these conventions so that when a faucet is installed, the faucet operates correctly when the left hot water line is connected to the left inlet and the right cold water line is connected to the right inlet.

However, certain difficulties arise in specific situations. In certain faucets, if the lever handle is replaced by a knob, for example, the conventional operation of the faucet is reversed, i.e., movement of a lever to the right conventionally provides cold water. However, this movement corresponds to counterclockwise rotation of a knob which conventionally should provide hot water. Therefore, a reversing mechanism is needed within the faucet, such as crossover of the inlets or a reversing bottom such as that shown in copending and commonly owned patent applications U.S. Ser. No. 804,261 and PCT/US86/01180. Incorporation of these two applications are herein made by reference.

Another common difficulty arises when the same type faucet is to be installed in two different rooms placed on opposite sides of a common wall and connected to common supply pipes. The cold water pipe that is conventionally located on the right for a first faucet turns out to be on the left for the other faucet. Before the development of the reversing bottom, either one accepts the fact that one faucet operates in a reverse fashion from convention, or it was necessary that the plumber cross the supply inlets. The only other alternative was to install a different faucet that was designed to compensate for the reversal of the supply pipes.

With the reversing bottom, one merely changes the position of the reversing bottom (by rotation or flipping) to compensate for the non conventional position of the supply pipes. However, with the reversing bottom, the plumber may get confused as to which position of the bottom corresponds to the conventional location of the supply pipes and which position corresponds to the reversed location of the supply pipes.

What is needed is an orienting and indicating mechanism that normally assures the proper orientation of the reversible bottom for conventional installation and prevent accidental reversal of the reversible bottom so that upon initial assembly of the valve, the faucet is assured to be assembled for the conventional installation. Furthermore, it is desirable to have a simple operation to override or defeat the orientation mechanism to provide for intended reversal of the reversible bottom.

SUMMARY OF THE INVENTION

According to the invention, a faucet valve has a cartridge housing which houses the control stem and movable valve element. A reversible bottom includes a plastic housing member with a first and second inlet and a fixed valve element with first and second apertures normally in communication with the first and second inlets, respectively. The fixed valve element can be a ceramic valve plate clipped onto the top portion of the plastic housing member.

The plastic housing member and cartridge housing have respective joint connectors to fasten the two members together. In addition, the cartridge housing and reversible bottom include an orienting mechanism that assures installation of the bottom in a first orientation. The orienting mechanism preferably includes a prong extending in a notch of one of the cartridge housing or bottom housing member and two opposing tabs on the other of the cartridge housing a bottom housing member. One tab has a groove to receive the prong and the second tab does not have a groove so that the second tab will not fit within the notch with the prong. Hence the reversible bottom can be fitted in only one orientation. A flange or other interfering member can be substituted for the prong and the first tab can have a step or complementary notch for the flange or interfering member instead of the groove.

The prong, flange, or other interfering member can be removable when the reversed orientation is desired. The second tab without the groove step or complementary notch can then be received in the notch that had the removed member.

More broadly, one of the shell or bottom members has a removable male member that can be received in a female receiver in the other of the shell to assure proper orientation. When the male member is removed, the bottom can then be reversed and installed in a second orientation.

In this fashion, the reversible bottom can normally be installed in only one orientation and accidental reversal can be avoided. However, if reversal of the bottom is intended, simple breaking off the prong and rotation of the bottom can provide for reversed orientation of the bottom when needed.

BRIEF DESCRIPTION OF THE DRAWINGS

Reference is now made to the accompanying drawings in which.

DETAILED DESCRIPTION OF THE PREFERRED EMBODIMENTS

Figure 1:
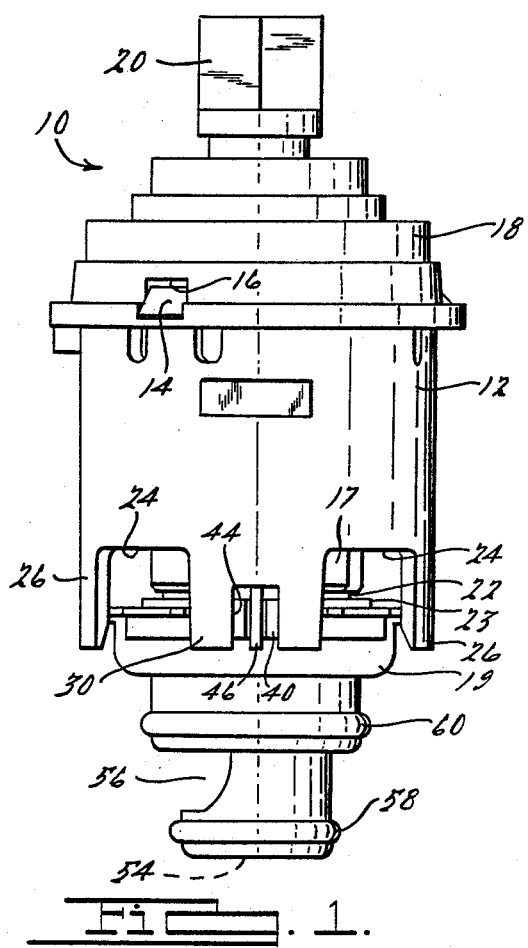
FIG. 1 is a rear elevational view of a cartridge valve for a single handle faucet having a reversible bottom snap fitted in place to the cartridge in the normal orientation.
Figure 2:
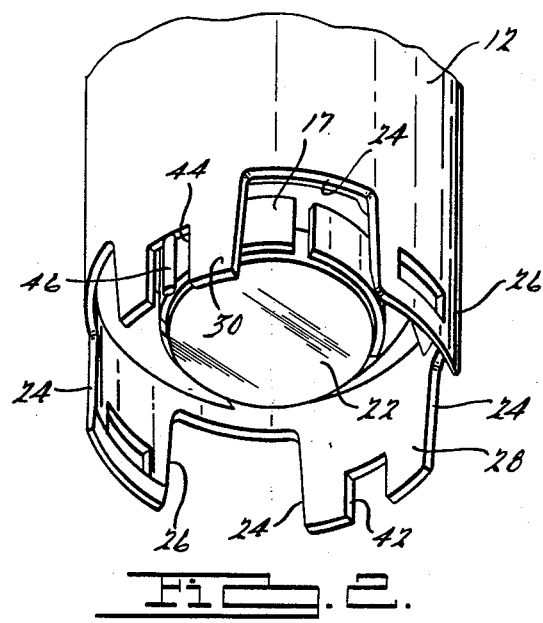
FIG. 2 is a bottom perspective view of the cartridge shown in FIG. 1.
Figure 3:
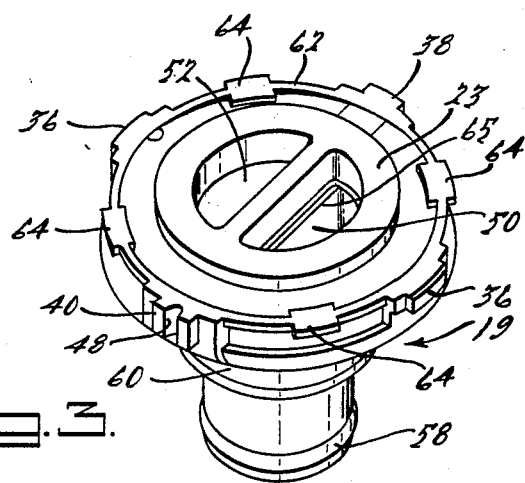
FIG. 3 is a top perspective view of the reversible bottom shown in FIG. 1.

A faucet valve 10 has a cartridge shell 12 connected to a cap 18 by release teeth 14 and receiving apertures 16. A control stem 20 extends upwardly through the cap 18 and is operably connected via a drive mechanism 17 to a movable valve plate 22. A reversible bottom housing member 19 is mounted to the lower end of the shell 12. The bottom housing member 19 mounts a fixed valve seat 23. The shell 12 and cap 18 of bottom housing member 19 can be made from suitable plastic such as Celcon M90. The stem 20 can be made from a chrome plated brass while the valve plate 22 and valve seat 23 can be a polished ceramic material.

As shown in FIGS. 1, 2, 4 and 5 the bottom of the shell 12 has a plurality of mixed water outlets 24 circumferentially spaced about the shell 12. Mounting flanges 26, 28 and 30 are interposed between the mixed water outlets 24. Two opposite flanges 26 have apertures 32 and inner ramps 34. These flanges 26 engage retaining tabs 36 on bottom housing member 19 to form a joint that snap fits bottom 19 onto shell 12.

An orienting and indicating mechanism is also provided by mounting flanges 28 and 30 and orienting tabs 38 and 40 on bottom housing member 19. Mounting flange 28 has a notch 42 at the lower end thereof. Mounting flange 30 has a notch 44 of the same size with a prong 46 extending therein. The prong 46 is integrally molded with the shell 12. Tab 38 is sized to fit within notch 42. Tab 40 has a groove 48 longitudinally extending therethrough and sized to receive pin 46 so that tab 40 fits in notch 44. While pin 46 remains, tab 38 cannot be received in notch 44 so that bottom member 19 can be oriented in only the position shown in FIG. 1.

Bottom member 19 mounts the valve seat commonly referred to as a fixed valve plate 23 that has a first outlet 50 and second outlet 52. The first outlet 50 is in fluid communication with a first inlet 54 and the second outlet 52 is in fluid communication with a second inlet 56 at the lower portion of bottom housing member 19. Circumferential O-rings 58 and 60 engage the walls of a valve body (not shown) which normally communicate the first and second inlets 54 and 56 and first and second outlets 50 and 52 to cold and hot water supply lines (not shown), respectively. An integrally formed retaining ring 62 has retaining tabs 64 which keep the fixed valve plate 23 properly seated on a gasket 65.

Figure 4:
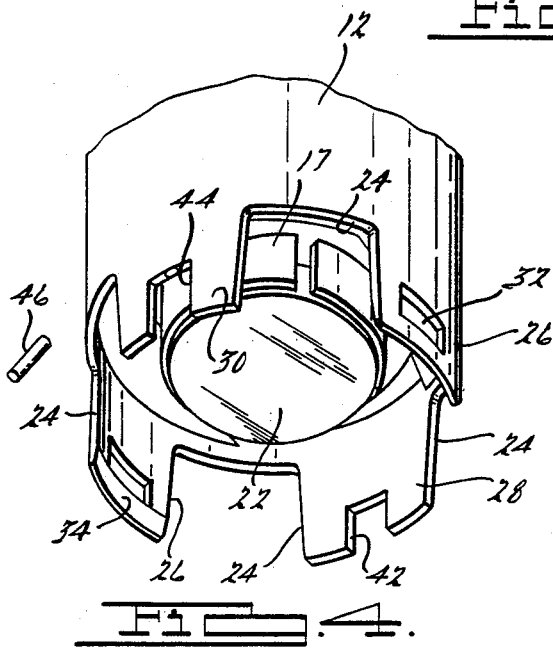
FIG. 4 is a view similar to FIG. 2 with the prong removed from the notch.
Figure 5:
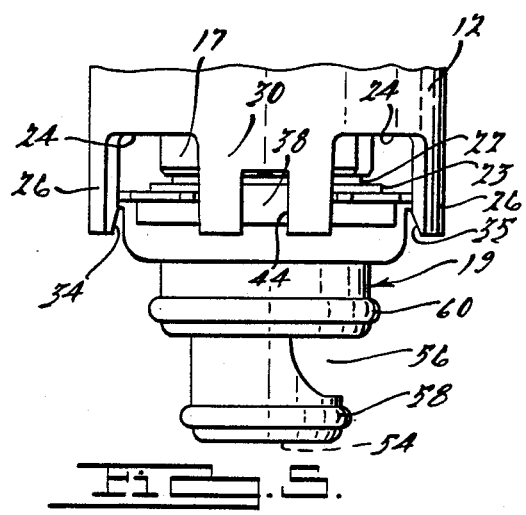
FIG. 5 is a fragmentary side elevational view of the cartridge valve with the reversible bottom snap fitted in place to the cartridge in the reverse orientation.

If the cold and hot water lines are reversed, hot water will then enter inlet 54 and cold water will enter inlet 56. To compensate for this reversed position of cold and hot supply lines, the bottom member 19 can be disengaged from shell 12 and reversed. As shown in FIG. 4, prong 46 can be snapped off, for example, with a small pliers or cutter. The bottom housing 19 can be rotated 180° and remounted to shell 12 as shown in FIG. 5, so that outlets 50 and 52 change position. Outlet 50 is then in communication with hot water and outlet 52 is then in communication with cold water, but the positions are reversed so that the movable valve opens and closes the outlets in the same fashion as before with conventional movement of the faucet handle providing conventional results.

The prong 46 and tabs 38 and 40 prevent accidental reversal of the bottom member 19 but provide for intentional reversal of the bottom member 19.

In this fashion, an orienting and indicating device allows for the correct factory installation of the bottom member onto the cartridge shell 12 for conventional installation of the valve in the faucet and for conventional installation of the faucet. Furthermore, a simple operation can override the orienting and indicating device so that the bottom member 19 can be reversed for certain intended installation.

The orienting and indicating device can also be used to reverse the function of certain faucets if replacement of the lever handle by a knob reverses the conventional operation of the faucet.

Furthermore, the orienting and indicating device can be used for the valves in two handle faucets where the operation of the hot or cold valve needs to be reversed. For example, the right cold valve when it has a knob is conventionally rotated counterclockwise from off to on, but when the knob is replaced by a lever handle, the rotation is clockwise from off to on. Hence, on certain valves that use valve plates, the bottom valve plate can be oriented in the same fashion as for the above described mixing valve.

Variations and modifications of the present invention are possible without departing from the scope and spirit as defined in the appended claims.

I claim:

1. A cartridge for a mixing valve faucet that regulates the flow rate and mixing proportions of liquid from two supply inlets to said faucet, said cartridge characterized by:
   a main shell;
   an operating mechanism mounted to said shell;
   a movable valve element operably connected to said operating mechanism;
   a separate reversible bottom member mounted to said shell;
   said bottom member mounting a fixed valve seat to cooperate with said movable valve element;
   a joint means for mounting said bottom to said shell;
   an orienting and indicating means for assuring a single standard orientation of said bottom member; and
   means for overriding said orienting and indicating means for deliberate reversing of the orientation of said bottom member.

2. A cartridge as defined in claim further characterized by:
   said joint means positioned and cooperating with said shell and bottom to mount said bottom to said shell in at least two rotated positions only when said means for overriding is effected.

3. A cartridge as defined in claim 2 further characterized by:
   said joint means being constructed to mount said bottom in two different rotated positions communication of said supply inlets to be inverted with said fixed valve seat at said respective two positions only when said means for overriding is effected.

4. A cartridge as defined in claim 1 further characterized by:
   said orienting and indicating means including a male member mounted on one of the shell and bottom member, the other of the shell and bottom member having a receptor for receiving said male member at one orientation of the bottom member with respect to the shell.

5. A cartridge as defined in claim 4 further characterized by:
   said male member being removable to allow a reverse orientation of said bottom member with respect to said shell.

6. A cartridge as defined in claim 4 further characterized by:
   said male member extending in a notch in one of said shell and bottom member;
   a second notch without a male member is radially located opposite said male member;

said other of said shell and bottom member has first and second radially opposite tabs, said first tab having a receptor for said male member and said second tab not having a receptor for said male member to assure a correct first orientation of said bottom member to said shell.

7. A cartridge as defined in claim 6 further characterized by:

said male member being removable from said notch to allow said bottom member to be rotated 180° to a reverse orientation and be joined to said shell.

8. A cartridge for a faucet valve that regulates the flow rate of liquid from a supply inlet to said faucet, said cartridge characterized by:

a main shell;

an operating mechanism mounted to said shell;

a movable valve element operably connected to said operating mechanism;

a separate reversible bottom member mounted to said shell;

said bottom member includes a fixed valve seat to cooperate with said movable valve element;

an orienting and indicating means for assuring a single standard orientation of said bottom member; and means for overriding said orienting and indicating means for deliberate reversing of the orientation of said bottom member.

9. A cartridge as defined in claim 8 further characterized by:

said bottom member being constructed to be mounted to said shell in a first rotated position when said orienting and indicating means is effective;

said bottom member being constructed to be mounted to said shell in a second rotated position only when said overriding means is effected.

10. A cartridge as defined in claim 8 further characterized by:

said orienting and indicating means including a male member mounted on one of the shell and bottom member, the other of the shell and bottom member having a receptor for receiving said male member at one orientation of the bottom member with respect to the shell.

11. A cartridge as defined in claim 10 further characterized by:

said male member being removable to allow a reverse orientation of said bottom member with respect to said shell.

12. A cartridge as defined in claim 10 further characterized by:

said male member extending in a notch in one of said shell and bottom member;

a second notch without a male member is radially located opposite said male member;

said other of said shell and bottom member has first and second radially opposite tabs, said first tab having a receptor for said male member and said second tab not having a receptor for said male member to assure a correct first orientation of said bottom member to said shell.

13. A cartridge as defined in claim 12 further characterized by:

said male member being removable from said notch to allow said bottom member to be rotated 180° to a reverse orientation and be joined to said shell.

* * * * *